United States Patent
Bohnert et al.

(10) Patent No.: US 7,462,685 B2
(45) Date of Patent: *Dec. 9, 2008

(54) METHOD FOR REMOVING CONTAMINANTS FROM PLASTIC RESIN

(75) Inventors: George W. Bohnert, Harrisonville, MO (US); Thomas E. Hand, Lee's Summit, MO (US); Gary M. DeLaurentiis, Jamestown, CA (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 155 days.

This patent is subject to a terminal disclaimer.

(21) Appl. No.: 11/426,503

(22) Filed: Jun. 26, 2006

(65) Prior Publication Data

US 2006/0281895 A1 Dec. 14, 2006

Related U.S. Application Data

(63) Continuation-in-part of application No. 11/096,880, filed on Apr. 1, 2005, now Pat. No. 7,253,253.

(51) Int. Cl.
*C08F 6/00* (2006.01)
*B01J 19/00* (2006.01)

(52) U.S. Cl. .................................. 528/480; 422/131
(58) Field of Classification Search .................. 422/131; 528/480
See application file for complete search history.

(56) References Cited

U.S. PATENT DOCUMENTS

| | | | |
|---|---|---|---|
| 4,379,525 A | 4/1983 | Nowicki et al. |
| 4,543,364 A | 9/1985 | Nankee et al. |
| 4,578,184 A | 3/1986 | Rasmussen |
| 4,680,060 A | 7/1987 | Gupta et al. |
| 4,714,526 A | 12/1987 | Pennisi et al. |
| 4,746,422 A | 5/1988 | Grimm |
| 4,918,160 A | 4/1990 | Kondoh et al. |
| 4,919,816 A | 4/1990 | Tsao |
| 4,959,232 A | 9/1990 | Underwood |
| 5,009,746 A | 4/1991 | Hossain et al. |
| 5,011,087 A | 4/1991 | Richardson et al. |
| 5,013,366 A | 5/1991 | Jackson et al. |
| 5,049,647 A | 9/1991 | Al-Ghatta |
| 5,073,203 A | 12/1991 | Al-Ghatta |
| 5,080,845 A | 1/1992 | Herrmann et al. |
| 5,110,055 A | 5/1992 | Teeny |
| 5,115,987 A | 5/1992 | Mithal |
| 5,126,058 A | 6/1992 | Beckman |
| 5,148,993 A | 9/1992 | Kashiwagi |
| 5,160,441 A | 11/1992 | Lundquist |
| 5,185,041 A | 2/1993 | Anderson et al. |
| 5,233,021 A | 8/1993 | Sikorski |
| 5,252,614 A | 10/1993 | Sisson |
| 5,258,491 A | 11/1993 | Agreda et al. |
| 5,270,067 A | 12/1993 | Underwood et al. |
| 5,271,773 A | 12/1993 | Hamilton et al. |
| 5,279,615 A | 1/1994 | Mitchell et al. |
| 5,290,505 A | 3/1994 | Huber et al. |
| 5,294,263 A | 3/1994 | Riso |
| 5,304,253 A | 4/1994 | Grant |
| 5,316,591 A | 5/1994 | Chao et al. |
| 5,330,581 A | 7/1994 | Syrinek |
| 5,339,844 A | 8/1994 | Stanford |
| 5,370,742 A | 12/1994 | Mitchell et al. |
| 5,401,322 A | 3/1995 | Marshall |
| 5,456,759 A | 10/1995 | Stanford, Jr. |
| 5,462,973 A | 10/1995 | Serad et al. |
| 5,467,492 A | 11/1995 | Chao |
| 5,533,538 A | 7/1996 | Marshall |
| 5,558,913 A | 9/1996 | Sasaki et al. |
| 5,651,276 A | 7/1997 | Purer |
| 5,669,251 A | 9/1997 | Townsend |
| 5,711,820 A * | 1/1998 | Smith et al. ................... 134/12 |
| 5,739,270 A | 4/1998 | Farmer et al. |
| 5,756,657 A | 5/1998 | Sawan et al. |
| 5,780,520 A | 7/1998 | Reeves et al. |
| 5,784,905 A | 7/1998 | Townsend |
| 5,822,818 A | 10/1998 | Chao |
| 5,858,022 A | 1/1999 | Romack |

(Continued)

FOREIGN PATENT DOCUMENTS

DE 4029720 4/1990

(Continued)

OTHER PUBLICATIONS

Operation Enterprise, Plastic Recycling Company to Move into Riverbank Industrial Complex, pp. 1-4, Fall 2004, Independence, MO.

(Continued)

*Primary Examiner*—Terressa M Boykin
(74) *Attorney, Agent, or Firm*—Hovey Williams LLP

(57) ABSTRACT

A resin recycling method that produces essentially contaminant-free synthetic resin material in an environmentally safe and economical manner. The method includes receiving the resin in container form. The containers are then ground into resin particles. The particles are exposed to a solvent, the solvent contacting the resin particles and substantially removing contaminants on the resin particles. After separating the particles and the resin, a solvent removing agent is used to remove any residual solvent remaining on the resin particles after separation.

47 Claims, 3 Drawing Sheets

U.S. PATENT DOCUMENTS

| | | |
|---|---|---|
| 5,858,107 A | 1/1999 | Chao |
| 5,925,192 A | 7/1999 | Purer |
| 6,200,352 B1 | 3/2001 | Romack |
| 6,200,943 B1 | 3/2001 | Romack |
| 6,212,916 B1 | 4/2001 | Carr |
| 6,248,136 B1 | 6/2001 | McClain |
| 6,258,766 B1 | 7/2001 | Romack |
| 6,260,390 B1 | 7/2001 | Carr |
| 6,287,640 B1 | 9/2001 | McClain |
| 6,297,206 B2 | 10/2001 | Romack |
| 6,306,222 B1 | 10/2001 | Kim et al. |
| 6,312,528 B1 | 11/2001 | Summerfield et al. |
| 6,369,192 B1 | 4/2002 | Dufresne et al. |
| 6,402,857 B2 | 6/2002 | Clark et al. |
| 6,536,059 B2 | 3/2003 | McClain et al. |
| 6,554,005 B1 | 4/2003 | Cords et al. |
| 6,616,770 B2 | 9/2003 | Musha et al. |
| 6,755,871 B2 | 6/2004 | Damaso et al. |
| 6,770,680 B2 | 8/2004 | Klenk |
| 6,919,383 B2 | 7/2005 | Khan et al. |
| 6,938,439 B2 | 9/2005 | Wikstrom et al. |
| 2001/0000001 A1 | 3/2001 | Clark et al. |
| 2002/0033550 A1 | 3/2002 | Suehara |
| 2002/0045730 A1 | 4/2002 | Yanagida |
| 2002/0048629 A1 | 4/2002 | Romack et al. |
| 2002/0189644 A1 | 12/2002 | Wack |
| 2003/0199596 A1 | 10/2003 | Koike et al. |
| 2003/0213747 A1 | 11/2003 | Carbonell et al. |
| 2003/0217764 A1 | 11/2003 | Masuda et al. |
| 2004/0079394 A1 | 4/2004 | Thouvenot et al. |
| 2006/0005572 A1 | 1/2006 | Wikstrom et al. |

FOREIGN PATENT DOCUMENTS

| | | |
|---|---|---|
| EP | 359106 | 3/1990 |
| EP | 0492043 | 7/1992 |
| EP | 521418 | 1/1993 |
| EP | 538730 | 4/1993 |
| WO | 92-09413 | 6/1992 |

OTHER PUBLICATIONS

Food Production Daily, Amcor Invests Heavily to Expand PET Recycling Capabilities, pp. 1-3, Jan. 27, 2003, Europe.

"Design for Recycling Guidelines", Association of Post-consumer Plastic Recyclers, Washington, DC, 2006.

"Plastic Recycling Process Improved", NC State researchers Developing Unique Technology, http://www.engr.ncsu.edu/news/news_articles/roberts.html, Apr. 3, 2003.

U.S. Appl. No. 11/096,880, Bohnert, George W., et al, filed Apr. 1, 2005.

U.S. Appl. No. 11/277,587, Bohnert, George W. et al, filed Mar. 27, 2006.

U.S. Appl. No. 11/426,522, Bohnert, George W. et al, filed Jun. 26, 2006.

U.S. Appl. No. 11/421,271, Bohnert, George W. et al, filed May 31, 2006.

U.S. Appl. No. 11/734,615, Bohnert, George W. et al, filed Apr. 12, 2007.

U.S. Appl. No. 11/733,590, Bohnert, George W. et al, filed Apr. 10, 2007.

U.S. Appl. No. 11/426,530, Bohnert, George W. et al, filed Jun. 26, 2006.

* cited by examiner

METHOD FOR REMOVING CONTAMINANTS FROM PLASTIC RESIN

CROSS REFERENCE TO RELATED APPLICATION

This application is a continuation-in-part (CIP) of U.S. patent application Ser. No. 11/096,880, filed Apr. 1, 2005, which is incorporated by reference.

GOVERNMENT SPONSORED DEVELOPMENT

The U.S. Government has rights in this invention pursuant to contract number DE-ACO4-01AL66850 with the United States Department of Energy.

BACKGROUND OF THE INVENTION

1. Field of the Invention

The present invention relates to an improved method and system for removing contaminants from synthetic resin materials, such as plastic. More particularly, the present invention relates a resin recycling method and system that produces essentially contaminant-free synthetic resin material in an environmentally safe and economical manner.

2. Description of the Prior Art

Recycling containers made from synthetic resin material is a highly desirable alternative to landfilling such containers. However, these containers often include residues of the material they once contained. These residues if not removed can decrease the value of the container material making it suitable for only low-grade products. Traditionally, these residues or contaminants have been difficult and expensive to remove and prone to create additional waste byproducts.

Recycling of motor oil containers is illustrative of the problem. Motor oil containers typically are high-density polyethylene (HDPE) which lends itself well to recycling if it is sufficiently clean. However, residual oil coating the interior surface of the "empty" motor oil containers constitutes a contaminant that prevents re-use of the containers in at least a high grade plastic application, such as the packaging of food or beverages.

The aforementioned problem is not just limited to oil containers. Similar contamination problems exist for example with pesticides from HDPE containers, milk from HDPE containers, "soda water" from polyethylene terephthalate (PET) containers, polychlorinated biphenyl (PCB) contaminants particularly from automotive plastics, and contaminants from various other post-consumer containers, such as detergent containers, collected from curbside recycling programs.

The significant amount of the above mentioned types of containers are currently disposed of in landfills, leaking oil and other contaminants into the soil and groundwater, and occupying significant landfill volume.

Several known options exist other than landfilling the waste synthetic resin containers, including (a) grinding the containers and using them in other recycling processes on a very limited (dilute) basis; (b) using an aqueous process to displace the contaminant from the synthetic resin material; (c) using a halogenated solvent to dissolve/dilute the contaminant; or (d) using a combustible or flammable solvent to dissolve/dilute the contaminant oil from the synthetic resin material.

The problems with these options are as follows:

Existing recyclers in the United States can blend limited quantities of contaminated synthetic resin materials in recycled products. Large quantities cannot be blended because of the undesirable effects of the contaminants on the recycled synthetic resin material properties. Examples include "plastic lumber" and lower grade plastic products.

Aqueous processes can be used to displace the contaminants from the synthetic resin material. However, detergents and/or surfactants are required to assist displacement of the contaminants. A stream of usable contaminant-free synthetic resin material will be generated by this method; however, the displaced contaminants will need additional processing to separate them from the aqueous solutions or dispersions. The aqueous solutions or dispersions themselves will be a secondary waste stream that will require treatment before being recycled or discharged as waste water.

Halogenated solvents can be used to dissolve/dilute the contaminants from the synthetic resin material. Again, usable synthetic resin material will be obtained by this process if the solvents do not extract essential components from the synthetic resin material. The halogenated solvent solutions will require distillation to recover the contaminants and recycle the solvents. In general, it is difficult to fully reclaim usable contaminants (such as oil) from the distillate. Furthermore, many halogenated solvents are ozone depleting compounds and potential health hazards to humans, and therefore their use and release into the environment are under regulation and close scrutiny by federal and state governments.

Combustible or flammable solvents may be used to dissolve and/or displace the contaminants from the synthetic resin material. Usable synthetic resin material can be generated by this method if the solvents do not extract essential components from the synthetic resin material. The combustible or flammable solvent solutions will require distillation to recover the contaminants and recycle the solvents. Only distillation equipment suitable for combustible or flammable solvents may be used and even then fire safety concerns will be significant. As in the case of the use of halogenated solvents, the contaminant may not be fully recoverable from the distillation.

Accordingly, there is a need for an improved system and method for removing contaminants from synthetic resin material containers. More particularly, there is a need for a system and method that will produce essentially contaminant-free synthetic resin material in an environmentally safe and economical manner.

SUMMARY OF THE INVENTION

The present invention solves the above-described problems and is directed to a resin recycling method that produces essentially contaminant-free synthetic resin material in an environmentally safe and economical manner. The method includes receiving the resin in container form. The containers are then ground into resin particles. The particles are exposed to a solvent, the solvent contacting the resin particles and substantially removing contaminants on the resin particles. After separating the particles and the resin, a solvent removing agent is used to remove any residual solvent remaining on the resin particles after separation. In various embodiments of the invention, the resin may be received in the form of bales of compacted containers. The containers may also be initially sorted by color before grinding. The solvent may be an organic solvent and the solvent removing agent is either a liquid or supercritical carbon. In yet another embodiment, the contamination-free particles are separated by type, such as HDPE or PET, after the particles are exposed to the solvent removing agent. These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Like reference numbers in the figures refer to like elements.

Figure 1:
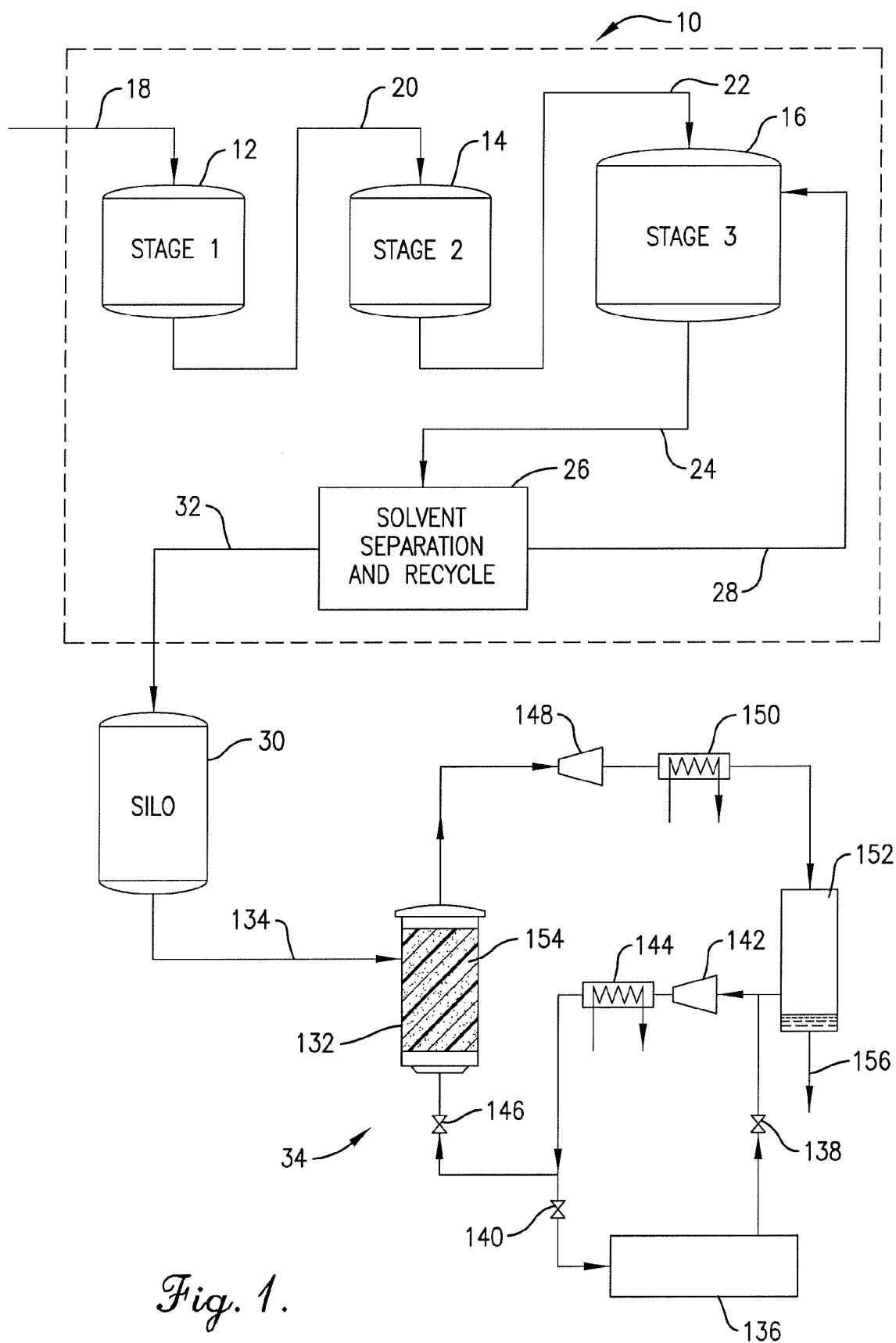
FIG. 1 is a schematic flow diagram depicting a three-stage solvent system and a liquid or supercritical carbon dioxide system for removing contaminants from particulate synthetic resin material.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIG. 1, a process for removing contaminants from post-consumer containers made from synthetic resin material in accordance with a preferred embodiment of the invention is illustrated. The present invention is particularly useful in the removal of oil from high density polyethylene containers, pesticides from HDPE containers, milk from HDPE containers, "soda water" from polyethylene terephthalate containers, polychlorinated biphenyl (PCB) contaminants particularly from automotive plastics, and contaminants from various other post-consumer containers, such as detergent containers, collected from curbside recycling programs. Also, the present system is highly effective in removing labels and label adhesive from synthetic resin material containers. Furthermore, the present invention facilitates contaminant recovery from synthetic resin materials thereby enabling the contaminants to be disposed of in a safe and environmentally friendly manner.

The upstream portion of the process comprises a liquid solvent cleaning system 10. Solvent cleaning system generally includes three separate cleaning stages 12, 14, and 16. Particulate synthetic resin material (illustrated as feed stream 18) is initially loaded into the first stage 12 which contains a liquid solvent. After a first cleaning cycle during which the particulate material is vigorously mixed with the solvent, the particulate material (illustrated as stream 20) is transferred to a second stage 14. Stage 14 operates in a very similar manner to stage 12 in that the particulate material is mixed with additional quantities of solvent. After the second cleaning cycle, the particulate material (illustrated as stream 22) is transferred to a third cleaning stage 16. The third stage 16 also is similar in operation to the first two stages 12, 14. However, for reasons explained in greater detail below, this stage preferably employs a greater quantity of solvent than either of the first two stages. Also, the solvent purity preferably increases from stage 12 to stage 14 to stage 16. The solvent contained in each successive stage is preferably cleaner than the previous stage in order to achieve the maximum solvation of the contaminants present on the synthetic resin material.

It will be appreciated that the stages 12, 14, and 16 do not necessarily need to be carried out in separate vessels. It is believed that the overall process functions most efficiently when these stages are carried out in separate vessels arranged in series, as a nearly continuous process can be achieved. However, it is possible that fewer than three separate vessels could be used and instead of the resin material being transferred from tank to tank, different batches of solvent (having different purities) may be moved in and out of the tank during each stage. In such manner, the particulate synthetic resin material is still contacted by three different batches of solvent, but need not leave the confines of a single vessel.

The particulate material (illustrated as stream 24) is then sent to a solvent separation and recycle station 26. At station 26, a substantial portion of the solvent is separated from the particulate material and recycled to the third cleaning stage 16 via conduit 28. Station 26 preferably employs a device, such as a spin dryer, to mechanically separate the solvent from the particulate material. The particulate material is then sent to a silo 30 via stream 32 to await further processing.

The downstream portion of the process comprises a carbon dioxide cleaning system 34. The setup of system 34 is nearly the same as that disclosed in U.S. Pat. No. 5,711,820, which is incorporated by reference herein. The objective of carbon dioxide system 34 in the context of the present invention is slightly different than in the '820 patent. In the present process, a substantial portion, and preferably almost all, of the contaminants are removed from the synthetic resin material prior to reaching carbon dioxide system 34. However, what remains on the synthetic resin material, in addition to trace amounts of contaminants, is mainly solvent from solvent cleaning system 10. At this stage, the synthetic resin flakes may still comprise between 0.1-5% by weight solvent which must be removed. Carbon dioxide system 34 is used to remove this solvent that is left over from solvent cleaning system 10. Unlike the process shown in the '820 patent, the present carbon dioxide system 34 is not principally directed toward removing oil contaminants from the synthetic resin flakes, but instead is directed toward removing residual solvent from the earlier system. Small amounts of contaminants may still be removed from the flakes during operation of carbon dioxide system 34, however, this is an incidental benefit as the vast majority of the contaminants have already been removed during the solvent cleaning system 10.

Preferably, the solvent used in solvent cleaning system 10 is relatively soluble in liquid or supercritical carbon dioxide (more so than the contaminants being removed from the synthetic resin material in system 10). Therefore, one advantage of the present system is that carbon dioxide system 34 can operate at lower pressures than if carbon dioxide system 34 were directly solvating the contaminants. Operation at lower pressures tremendously lowers equipment costs and energy costs associated with liquefying the carbon dioxide.

As indicated by the dashed line, system 10 is preferably a closed system employing vessels that are sealed or blanketed with an inert gas such as nitrogen to prevent volatilization and escape of solvent to the outside environment. In addition, silo 30 is preferably a closed vessel and does not permit much if any residual solvent adhered to the synthetic resin particles to escape to the environment. As a closed system, system 10 does not present significant environmental concerns as it is relatively self-contained and does not produce significant emissions. Also, the closed nature of system 10 allows for recycling of a substantial portion of the liquid solvent used therein with low make up demands. These features result in a reduction in operating costs of approximately 40% compared to conventional water-based contaminant removal systems and also avoids having to deal with the clean up of contaminated water.

Figure 2:
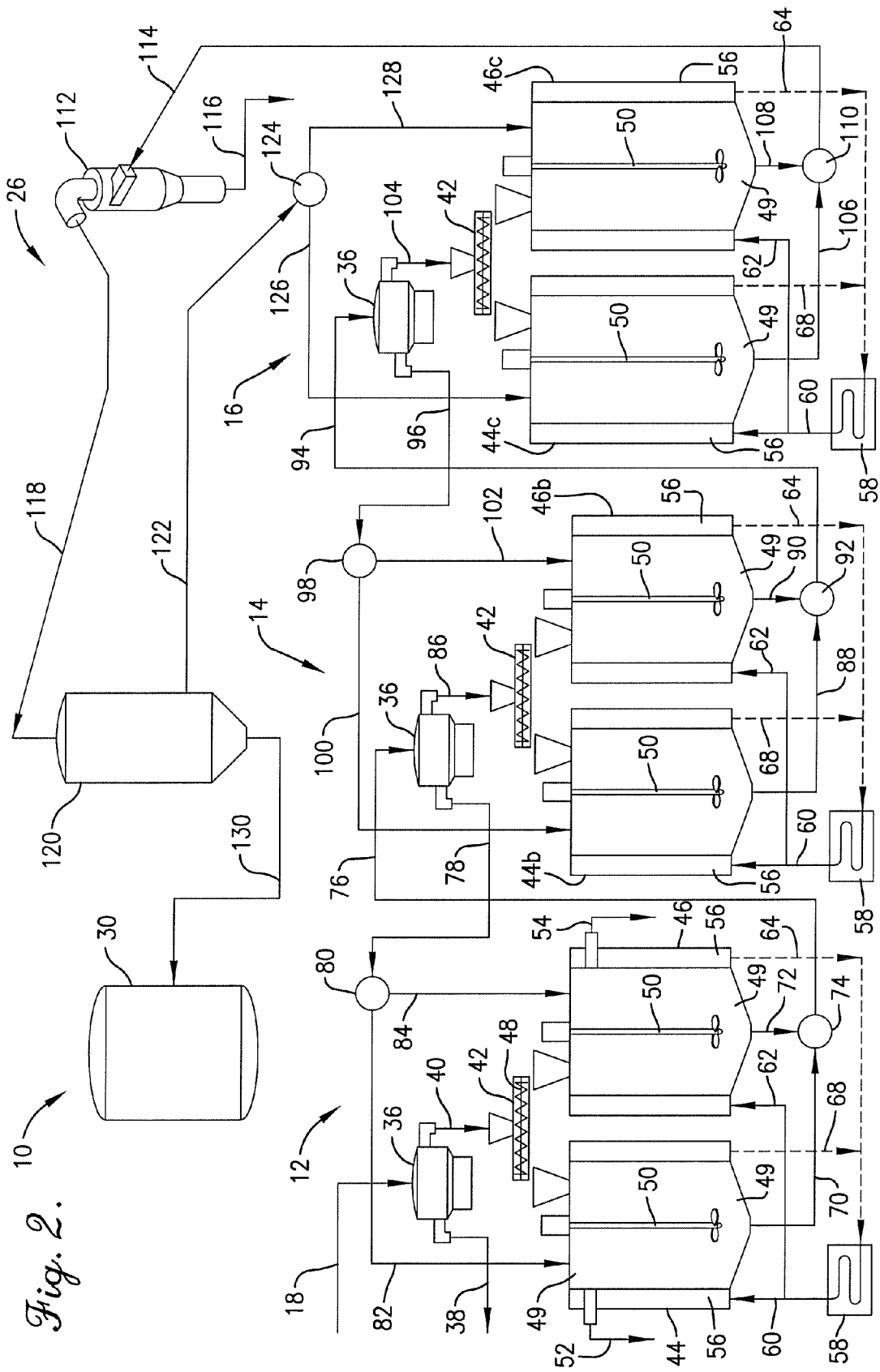
FIG. 2 is a detailed view of the three-stage solvent system shown in FIG. 1.

Turning now to FIG. 2, the solvent cleaning system 10 is shown in greater detail. Stages 12, 14 and 16 are relatively similar with the possible exception of equipment sizing. Therefore, those features common to all three stages are described using the same reference numerals. A feed stream 18 of particulate material ground into approximately ⅜" flakes enters stage 12 and is directed initially to a separator 36 primarily for separation of unacceptably large particles of synthetic resin material that could be difficult to process. The separator can be any sieve or filter-type apparatus suitable for performing this separation, however, apparatus such as a Sweco separator is preferred. The rejected particles exit separator 36 through stream 38 and may be returned to a shredding or grinding device (not shown) for further processing to reach an acceptable size (approximately ⅜").

Synthetic resin particles of acceptable size exit separator 36 through stream 40 and are directed toward a conveyer 42 for distribution to either of cleaning tanks 44 or 46. Conveyer 42 comprises a reversible auger 48 that is capable of directing the particulate synthetic resin material to both tanks 44 and 46. In operation, material is loaded into one tank until its capacity has been reached. The cleaning cycle is begun in that tank and auger 48 reverses direction so as to begin filling the other tank. By providing two tanks in parallel, a nearly continuous process may be achieved.

Tanks 44 and 46 (and all such related tanks) are preferably double-walled tanks, the inner compartments 49 of which contain a liquid solvent capable of dissolving contaminants that may be present on the synthetic resin material. This double-wall feature provides extra protection against accidental release of solvent and contaminants.

A feature unique to tanks 44 and 46 is that these tanks are equipped for separation of less dense synthetic resin material from more dense material. For example, many synthetic resin material containers made from polyethylene terephthalate (PET) employ caps made from less dense polypropylene material. It is often desirable to separate these two kinds of materials during recycling operations. Manual separation of these different materials can be very costly. The present invention accomplishes this separation through the careful selection of a solvent that has a specific gravity in between the specific gravities of the two kinds of materials. Therefore, the less dense polypropylene material will float in the solvent while the more dense PET tends to sink. A skimming device may be used to remove the lesser dense material from tanks 44 and 46 via streams 52 and 54, respectively. Alternatively, gates located proximate the top of tanks 44 and 46 open thereby draining the lesser dense material along with a quantity of solvent which is then filtered and the solvent returned to the respective tank. In some instances, the desired synthetic resin material may have a density that is too close to that of the cap material to facilitate floatation separation. It is then desirable to separate the caps from the containers prior to grinding of the containers.

Each of tanks 44 and 46 is equipped with a mixer 50 for agitating the contents of the tank. Preferably, this agitation is quite significant and can be characterized as violent so as to insure the maximum possible contact of the synthetic resin material with the solvent. A preferred mixer 50 for use with the present system is a Neptune mixer having at least one propeller attached to the mixer shaft.

As previously stated, tanks 44 and 46 are jacketed. The outer compartment 56 of each tank contains a heat transfer fluid for heating and maintaining the temperature of the solvent within the inner compartment 49. Preferably, any suitable heat transfer fluid may be used, however, a glycol such as propylene glycol or ethylene glycol is particularly preferred. The heat transfer fluid is preferably heated to a temperature of between about 170-190° F. using heat exchanger 58. Consequently, the solvent contained within the inner compartment 49 will also be heated to a temperature between about 170-190° F. Using a jacketed vessel to heat the solvent allows heating to be accomplished without use of an open flame near the solvent vessel. This feature adds to the overall safety of the system. The glycol solution is constantly circulated between tanks 44 and 46 and heat exchanger 50 via conduits 60, 62, 64, and 68.

In alternative embodiments, the solvent is not heated to such a high temperature. For example, the solvent can be heated in the range of 90 to 110° F. In one specific embodiment, the solvent is heated to approximately 100° F. The lower temperatures help reduce operating costs and reduce the amount of solvent loss due to evaporation.

The synthetic resin particles and solvent are agitated for a predetermined length of time. This length of time is dependant upon many factors such as tank size, solvent purity, and the nature of the solvent itself and its capacity for solubilizing the particular contaminants. However, it is preferable for agitation to occur over a relatively short time period, preferably less than 15 minutes, more preferably between 1-12 minutes, and most preferably between about 4-5 minutes. At the end of the agitation cycle, the contents of either tank 44 or 46 are emptied via conduit 70 or 72, respectively. The slurry comprising solvent and synthetic resin material is then pumped by pump 74 and directed to stage 14 via conduit 76.

The slurry passes through a second separator 36 whereby the particulate material is separated from the solvent which is then recycled back to stage 12 via conduit 78. Pump 80 directs the recycled solvent to either tank 44 or 46 via conduits 82 or 84, respectively. The synthetic resin material (illustrated as stream 86) is directed to a second conveyer 42 which distributes the particulate material between tanks 44b and 46b. Stage 14 then operates in a similar manner to stage 12 with the exception of the extra step of separating synthetic resin materials of different densities by flotation removal.

At the completion of the agitation cycle, the slurry of solvent and particulate material exits the respective tank through conduit 88 or 90 and is pumped by pump 92 to stage 16 via conduit 94. Stage 16 begins with the slurry being passed through a third separator 36 with the solvent being separated and recycled back to stage 14 through conduit 96. Pump 98 directs the recycled solvent back to the appropriate tank through either conduit 100 or 102.

The synthetic resin material leaves separator 36 as stream 104 and is directed to conveyer 42 for distribution between tanks 44c and 46c. Stage 16 then operates in a manner that is similar to the operation of stages 12 and 14. At the completion of the agitation cycle, the solvent and synthetic resin material slurry exits tanks 44c and 46c via conduits 106 and 108, respectively, and is pumped by pump 110 to hydro cyclone 112 via conduit 114.

The hydro cyclone 112 separates solid waste material present in the slurry from the particulate synthetic resin material. The solid waste could be any undesirable particulate material present in the slurry including metal particles and other heavy solid particles that heretofore may have not been separated from the synthetic resin material or solvent. This waste then exits the system as stream 116. The ratio of solvent to synthetic resin material present in the slurry entering the hydro cyclone is dependent upon a number of factors such as the density of the synthetic resin material. Furthermore, the interior of the hydro cyclone must be changed out depending upon the different types of synthetic resin material present in the slurry.

The slurry is directed through conduit 118 toward spin dryer 120 where a substantial portion of the solvent is separated from the synthetic resin material and recycled back to stage 16 through conduit 122 and pump 124. The recycled solvent is then distributed between tanks 44c and 46c through conduits 126 and 128. Spin dryer 120 preferably removes at least about 90% by weight of the solvent present in the slurry, more preferably at least about 95% by weight of the solvent, and most preferably at least about 98% by weight of the solvent. After exiting the spin dryer, the particulate synthetic resin material is transported as stream 130 to storage silo 30 where it is held until it can be sent to carbon dioxide system 34.

The solvent used in system 10 is carefully selected based on various desirable characteristics. First, the solvent should be capable of solvating a number of different kinds of contaminants without causing significant break down of the synthetic resin materials dispersed therein. Second, the solvent should exhibit a specific gravity to facilitate flotation separation of synthetic resin materials of different densities. Using the polypropylene cap and PET container example, it is desirable to separate the cap material from the more valuable PET. The polypropylene material exhibits a specific gravity of about 0.90 whereas PET generally exhibits a specific gravity of between about 1.3-1.4. Preferably, the solvent will have a specific gravity in between these two figures and more preferably will have a specific gravity proximate to that of water. If flotation separation is not a critical feature of the particular process, the specific gravity of the solvent is not as critical a factor. However, it is preferable for the solvent to comprise an organic solvent other than carbon dioxide having a specific gravity (preferably at 20° C.) of at least about 0.76, more preferably between about 0.9-1.5, and most preferably between about 0.95-1.25. Suitable solvents may be selected from various classes of chemicals such as esters, ketones, glycols, glycol ethers, halogenated solvents, aromatics, alcohols, aliphatic hydrocarbons, amines, and terpenes. More specifically, the solvent is selected from the group consisting of amyl propionate, butyl butyrate, alkyl lactates, ethyl hexyl acetate, dibasic esters, methyl soyate, ethyl soyate, cyclohexanone, methyl ethyl ketone, dipropylene glycol, dipropylene glycol methyl ether, trichloroethylene, xylene, ethanol, tetrahydrofurfuryl alcohol, hexane, mineral spirits, monoethanolamine, d-limonene, dimethyl formamide, n-methyl pyrrolidone, propylene carbonate, and combinations thereof. Preferably, the solvent is an alkyl ester solvent having the general formula RCOOR', wherein R and R' are independently selected from C1-C10 alkyl groups and R contains at least one hydroxyl group. Alkyl lactates are particularly preferred solvents for use with the present invention.

Preferred alkyl lactates include methyl lactate, ethyl lactate, isopropyl lactate, and butyl lactate, all of which are available under the name PURASOLV by PURAC America, Inc., Lincolnshire, Ill. Of the alkyl lactates, ethyl lactate is particularly preferred. These solvents exhibit specific gravities at 20° C. of between 0.98-1.09, are generally miscible with water, and have a high capacity for solvating various organic contaminants such as grease and oil. Furthermore, these solvents are relatively non-toxic and, in some instances, have been approved by the FDA for food applications. The lack of solvent toxicity is an added benefit and contributes to the environmentally friendly nature of this system.

Solvent compatibility with the synthetic resin material is also an important property as it is undesirable for the solvent to solvate the synthetic resin material in addition to the contaminants. Synthetic resin material such as polypropylene, polyethylene, polyethylene terephthalate, nylon, polytetrafluoroethylene, polytetrafluoroethylene, polyvinylidene fluoride, polycarbonate, fluorinated ethylene propylene, polybutylene terephthalate, polyimide, polyetherketone, polyetherimide, polybutylene, polyphenylene oxide, polystryene, polysulfone, polyethersulfone, polymethylpentene, polyvinyl chloride, acetal, acrylic, acrylonitrile-butadiene-styrene (ABS), and combinations thereof, are considered to be compatible with many of the preferred solvents according to the present invention.

Carbon dioxide system 34, as shown in FIG. 1, is an exemplary closed loop separation system suitable for separation of residual solvent adhered to the synthetic resin particles after treatment in solvent system 12. Carbon dioxide system 34 is also capable of removing trace amounts of contaminants that may still be present on the synthetic resin particles; however, the primary function of system 34 is to separate the solvent residue from the particles thereby producing solvent and contaminant free material.

The particulate synthetic resin material is transferred from storage silo 30 to extraction vessel 132 via stream 134 (preferably an auger transport device). Typically, the material will be enclosed in a steel mesh basket or other porous metal enclosure so that the synthetic resin material will not be swept out of the extraction vessel 132 into other portions of the separation system 34 by the flowing carbon dioxide described below. The system is then filled with carbon dioxide from a reservoir 136 through a control valve 138 to a pressure suitable to satisfy the desired pressure and temperature conditions in operation as described further below. With the control valves 138 and 140 shut off, carbon dioxide flow is established from the compressor 142 and associated heat exchanger 144 through control valve 146, through the extraction vessel 132, through the expansion device 148 and associated heat exchanger 150, through separation vessel 152 and to the compressor 142 for another cycle. Adjustments to the compressor 142 speed, expansion device 148, and the temperature of the heat exchangers 144 and 150 allows the extraction vessel 132 and separation vessel 152 to be maintained at the desired pressures and temperatures as described further below. Such adjustments may be made manually or controlled by commercially-available computer software and equipment. Overall charge of the system may be adjusted by admitting more carbon dioxide from reservoir 136 through control valve 138 or by discharging carbon dioxide to the reservoir through control valve 140.

In the extraction vessel 132, the desired temperature and pressure for solvency of the solvent in liquid or supercritical carbon dioxide is typically from about 600-5000 psia (more preferably from 650-1000 psia, and most preferably from about 700-800 psia) and from about 20-100° C. (more preferably from about 30-90° C., and most preferably from about 60-70° C.). The solvent-free liquid or supercritical carbon dioxide continuously enters the bottom of the extraction vessel 132 and flows upward past the synthetic resin material 154, dissolving the solvent carried on the material 154 (from system 10) and flushing it away. It is of some importance that the flow of carbon dioxide be introduced to the bottom of extraction vessel 132, since the upward flow will tend to fluidize the bed of synthetic resin material 154 and hasten dissolution of the solvent.

The solvent-laden carbon dioxide continuously exits from the top of extraction vessel 132 and flows to the expansion device 148 and heat exchanger 150. Expansion device 148 and heat exchanger 150 are set such that the carbon dioxide entering the separator vessel 152 is in the gaseous phase; typically from about 400-1000 psia and from about 20-35° C. Under these gaseous conditions, the carbon dioxide has negligible solubility for the solvent, and therefore the solvent (including any trace amounts of contaminants) is precipitated out of solution, forming a two-phase system of liquid solvent and gaseous carbon dioxide, and the solvent collects in the bottom of separator vessel 152. The now solvent-free carbon dioxide gas is compressed through the compressor 142 wherein the pressure is raised equal to or greater than that of the extraction vessel 132. The temperature of the carbon dioxide then is adjusted to the desired value as it flows through heat exchanger 144, from where it reenters the extraction vessel 132 as either liquid or supercritical (depending on the pressure and temperature chosen) carbon dioxide to again dissolve and flush away solvent from the synthetic resin material 154. This recirculation of the carbon dioxide is continued until all of the solvent has been removed from the synthetic resin material and deposited in the separator vessel 152.

When the separation of the solvent from the synthetic resin material is complete, with control valve 146 closed, the clean carbon dioxide is routed into the storage reservoir 136 through control valve 140 to be used again later. The solvent-free synthetic resin material 154 is removed from the extraction vessel 132 (preferably by a vacuum system) and sent to a storage silo. The solvent 156 recovered is drained from the separator vessel 152. The only waste released by this process is the small amount of carbon dioxide gas vented during final depressurization of the extraction vessel 132.

The solvent 156 recovered by carbon dioxide system 34 is preferably recycled to solvent cleaning system 10, or if necessary, may be sent to a purification system. Periodically, the solvent used in stages 12, 14, and 16 will need to be changed out and purified as the solvent becomes saturated with contaminants. The time period between these change outs is dependent upon a number of factors including the stage in which the solvent is being used and the solvent's capacity or solvating power (sometime referred to as the Kauri butanol value), but is typically every several hours. The solvent is drained from the respective stage and sent to a distillation system for separation of the solvent and the contaminants. The operating conditions of the distillation system depend largely upon the flash point of the solvent, but preferred solvents according to the present invention are typically heated to about 300° F. and then re-condensed. The contaminant waste is then properly disposed or recycled. Recovery of the contaminant waste for proper disposal is an important advantage of the present invention. If the contaminants were not recovered, particularly the more toxic contaminants, they would likely wind up in a landfill along with the synthetic resin material where they could cause soil and groundwater contamination.

The solvent stages 12, 14, and 16 need not be taken off-line for substantial periods of time during this process as fresh solvent can be added immediately following removal of the "dirty solvent" and the process continued while the dirty solvent is being purified. System 10 as shown in FIG. 2 is particularly designed to avoid this downtime as tanks 44 and 46 are situated in parallel, so that one tank is operational while the other is taken down for solvent change over. In essence, the system 10 is designed to function as a continuous-batch process.

The aforementioned upstream liquid solvent wash system 10 and downstream carbon dioxide wash system 34 is well suited for implementation in a resin recycling method that produces essentially contaminant-free synthetic resin material in an environmentally safe and economical manner. In general, the method includes receiving and sorting the resin. Once the resin has been sorted, it is ground into particles. The particles are then exposed to a solvent, the solvent contacting the resin particles and substantially removing contaminants on the resin particles. After separating the particles and the resin, a solvent removing agent is used to remove any residual solvent remaining on the resin particles after separation. The substantially contamination-free particles are then sorted by type. In various embodiments, the resin is received in bales and initially sorted by color before grinding. The solvent is an organic solvent and the solvent removing agent is either a liquid or supercritical carbon. In the final sorting, the contamination-free particles are separated by type, such as HDPE, PET, PVC, etc.

Figure 3:
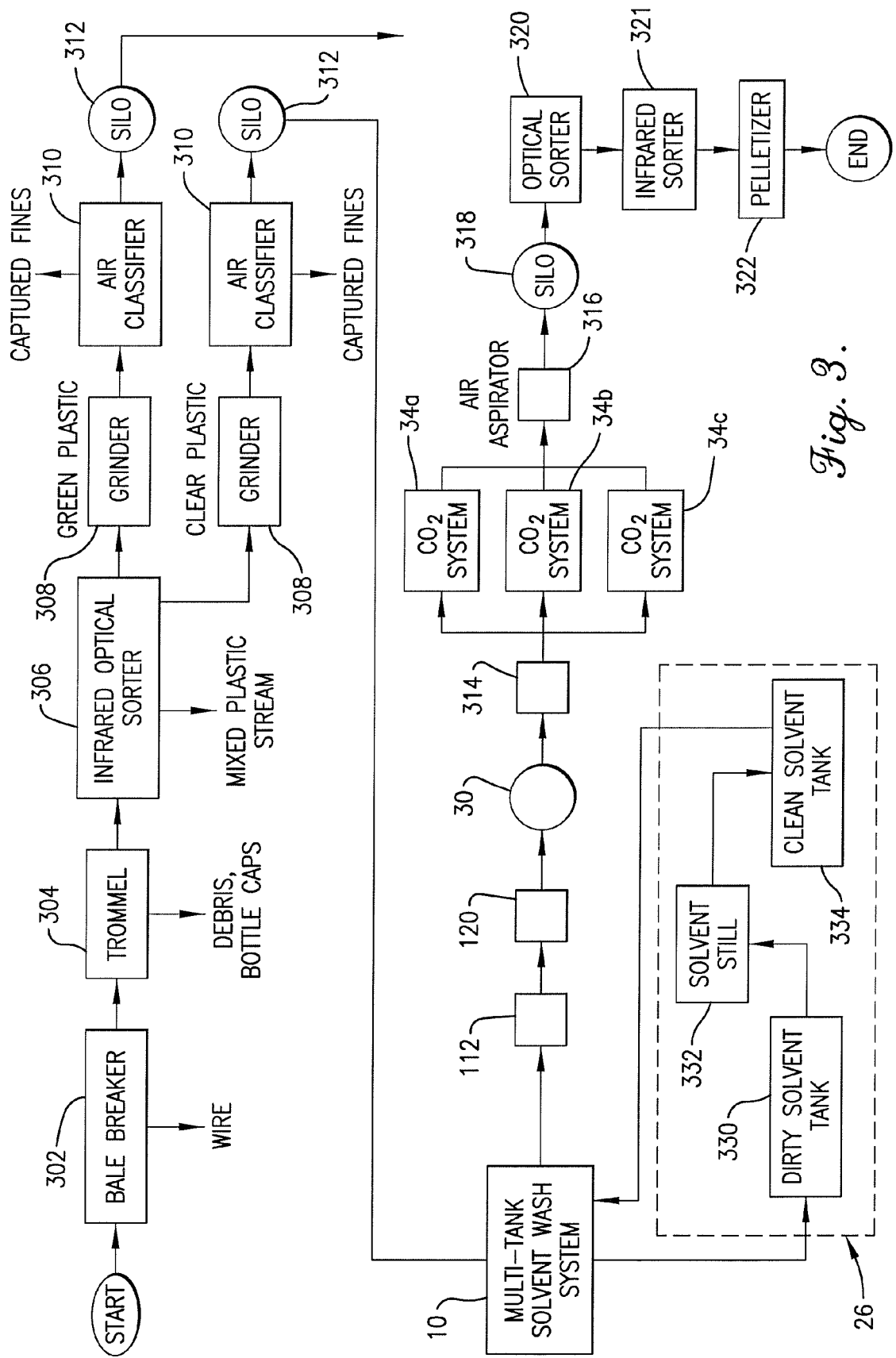
FIG. 3 is a diagram illustrating a resin recycling method and apparatus according to the present invention.

Referring to FIG. 3, a diagram illustrating a resin recycling method and apparatus according to the present invention is shown. The recycling system 300 includes one or more bale breakers 302, one or more trommels 304, one or more sorters 306, one or more grinders 308, one or more air classifiers 310, one or more silos 312, the multi-tank solvent wash system 10, hydro cyclone 112, spin dryer 120, silo 30, loader 314, one or more carbon dioxide wash systems (34a, 34b, and 34c), an air aspirator 316, silo 318, an optical sorter 320, infrared sorter 321, and a pelletizer 322.

It should be noted that for the sake of simplicity, only one recycling line including solvent wash system 10, hydro cyclone 112, spin dryer 120, silo 30, loader 314, one or more carbon dioxide wash systems (34a, 34b, and 34c), an air aspirator 316, silo 318, an optical sorter 320, and infrared sorter 321 is shown in the figure only for clear plastic resin. In an actual implementation of the present invention, either the non-clear (i.e., green) resin would be separated. When a sufficient amount of the non-clear resin was collected, it would be run through the resin recycling method and apparatus as shown in FIG. 3. Alternatively, a parallel recycling line including multi-tank solvent wash system 10, hydro cyclone 112, spin dryer 120, silo 30, loader 314, one or more carbon dioxide wash systems (34a, 34b, and 34c), an air aspirator 316, silo 318, an optical sorter 320, infrared sorter 321, and a pelletizer 322 would be provided for the sorted green plastic resin.

it should be noted that the number of tanks in the solvent wash system and the number of carbon dioxide systems 34 is arbitrary and is selected based on the desired throughput of the system. The numbers of tanks and carbon dioxide systems illustrated and described herein should in no way be construed as limiting the invention. Either more or fewer solvent wash tanks and carbon dioxide systems may be used.

The bale breaker 302 is designed to remove the retaining wires binding bales of compressed containers. As the bales are received, the bale breaker removes the wires holding the bale together and then forwards the bale to the trommel 304. In the trommel 304, the compressed containers are repeatedly lifted, rotated and dropped in a tumbling action, causing the individual containers to separate upon impact. Debri such as bottle caps and dirt are loosened by the tumbling action and typically fall to the wayside. As the containers are tumbled in the trommel 304, they eventually separate and are forwarded onto a conveyor belt (not shown) and are then fed to the optical sorters 306. In one embodiment, the optical sorter 306 separates the individual containers by color. In the example shown, into a clear stream and a green stream. The containers of the two streams are then fed into two grinders 308 respectively. Each grinder 308 is designed to reduce the containers into approximately ⅜ inch flake shaped resin particles of like color. The grinders 308 are heavy duty industrial type that include a large number of blades that grind the containers into the particles in a grinding chamber. Silos 312 are used to store the clear and green resin particles respectively.

The resin particles are next introduced into multi-tank solvent wash system 10 from the silo 312. As described in detail above, the particles are exposed to a solvent in the tanks, thereby substantially removing contaminants on the particles. The hydro cyclone 112 separates the solid waste material present in the slurry exiting the solvent wash system 10 and the spin dryer 120 is used to separate the solvent from the resin particles. The particles are then stored in another silo 30 before being loaded by loader 314 into the carbon dioxide wash systems 34a, 34b, and 34c. The air aspirator 316 separates any bits of label paper or other light material present on the substantially solvent-free resin existing the carbon dioxide wash. The optical sorter 320 is used to separate the resin stored in silo 318 by type, for example HDPE, PET, PVC, mixed plastic, vinyl chloride, polyethylense, etc. Infrared sorter 321 sorts by color. In an optional step, the sorted resin particles may be pelletized by pelletizer 322. Once the particles have been sorted by type and optionally pelletized, the material can be recycled and reused to make packaging containers and bottles.

With the above describe system and method, the sorting of the plastic resin is purposely done at different stages of the process. This redundancy helps assure that the final product is sorted by resin type and color to a very high degree of accuracy. As a general rule of thumb, the bales as received are typically "pre-sorted" That is, the bales generally contain one type of plastic resin, such as either PET or HDPE. The problem with the bales, however, is that containers in the bales are typically pre-sorted by humans. The bales consequently often contain containers of a resin type that does not belong in the bale due to human error. The optical sorter 306 performs a first sorting by color. The resin sorted by color then travels through separate solvent wash and carbon dioxide wash lines as described above. Sorting is also performed within the multi-tank solvent wash system 10. As noted above, by selecting the specific gravity of the solvent, high density resin can be sorted or separated from low density materials. For example, many synthetic resin material containers made from polyethylene terephthalate (PET) employ caps made from less dense polypropylene material. It is often desirable to separate these two kinds of materials during recycling operations. The less dense polypropylene material may be skimmed from the top of the solvent tanks and collected. When a sufficient amount of the polypropylene material is collected, it too may be passed through the system shown in FIG. 3. Sorting is also performed at the back end of the system and method. The optical sorter 320 sorts by the type of resin, such as HDPE, PET, PVC, mixed plastic, vinyl chloride, polyethylense, etc. An optional sorter 321 also sorts by color. By building sorting redundancy into the system, the final product can be sorted to a very high degree of accuracy.

The aforementioned system is also designed to remove any paper labels and similar contaminants provided on the bottles and containers received on the bales. Paper labels are typically attached to bottles and containers by glue on the edges of the label. During grinding in the grinders 308, the non-glued portion of the labels on the containers are typically liberated. The ground resin particles are next passed through air classifiers 310. Using an adjustable airflow and baffles, the classifiers 310 blow or remove fines and light fragments, such as the liberated labels, from the resin particles. In the multi-tank solvent wash system 10, the glue used to attach labels onto the resin particles is typically dissolved and remove, liberating any remaining portion of the labels affixed to the resin by the glue. Finally, the air aspirator 316 removes any remaining bits and pieces of labels, other fines or light fragments not removed by either hydrocyclone 112 or the spin dryer 120. As a result, labels or other fines are substantially removed from the resin particles stored in silo 320.

The solvent recycle station 26 includes, in one embodiment, a dirty solvent tank 330, a solvent still 322 and a clean solvent tank 334. During recycling operations, the solvent in the multi-tank system 10 becomes dirty from the contaminants removed from the resin particles. When the solvent needs to be replaced, it is removed from the multi-tank solvent wash system 10 and stored in the dirty solvent tank 330. Clean solvent is then removed from the clean solvent tank 334 to replenish the removed solvent from the tanks. The dirty solvent is pumped into solvent still 332 while pulling a vacuum at a very high temperature (e.g. 250 to 350 degrees F., and in one specific embodiment 300 degrees F.), causing the dirty solvent to convert into a gaseous state. The contaminants, however, remain in the solid state and drop into a collect bucket in the solvent still. The cleaned solvent is then cooled back to the liquid state in coils and then stored in the clean solvent tank 334 for later use.

The pellitizer 322 is a machine that converts the cleaned resin particles, typically in flake form, into pellets. The pellitizer heats the resin particles from a solid state into a liquid state. The liquid is then pushed or extruded through a filter screen and die plate. The filter screen removes any particles or contaminants in the liquid resin. As the liquid is extruded through the die plate, knife blades cut the resin, forming pellets upon solidification.

In the beverage industry for example, the bottles are often made from virgin PET material in pellet form. With the present invention, the recycled resin in pellet form is sufficiently clean and free of contaminants, residue, or odors that it can readily meet or exceed the high qualification standards required by most bottlers. Thus with the system and method of the present invention, the bottles can be made for the soda and beverage industry using completely recycled resin, or a mix of recycled and virgin resin.

Although the invention has been described with reference to the embodiments illustrated in the attached drawing figures, it is noted that equivalents may be employed and substitutions made herein without departing from the scope of the invention as recited in the claims. For example, the sorting can occur using some other criteria besides the color or the containers or the type of material. The size in which the resin particles are ground is also optional and can be made either larger or smaller than specified herein. The type of solvent or the solvent removing agent used is also arbitrary and does not necessarily have to be of the same type or phase described herein. Having thus described the various embodiment of the invention, what is claimed as new and desired to be protected by Letters Patent includes the following:

The invention claimed is:
1. A method of recycling resin, comprising:
receiving resin at a receiving station;
moving the received resin from the receiving station to a grinding station;
grinding the received resin into resin particles at the grinding station;
moving the grinded resin particles to a solvent exposure station;
exposing the resin particles to a non-carbon dioxide based solvent, the solvent contacting the resin particles and substantially removing contaminants on the resin particles at the solvent exposure station;

moving the solvent after solvent exposure to a solvent separation station;

separating the solvent from the resin particles at the solvent separation station;

moving the solvent to a solvent removing station; and exposing the resin particles to a solvent removing agent to substantially remove any residual solvent remaining on the resin particles after separation at the solvent removing station.

2. The method of claim 1, wherein exposing the resin particles to the solvent further comprises agitating the resin particles for a predetermined period of time in the solvent.

3. The method of claim 2, wherein the predetermined period of time consists of one of the following: less than 15 minutes; between 1 to 12 minutes; or between 4 to 5 minutes.

4. The method of claim 1, wherein exposing the resin particles to the solvent further comprises heating the solvent contacting the resin particles.

5. The method of claim 4, wherein the heating the solvent further comprises heating the solvent to one of the following: a temperature range from 170 to 190 degrees Fahrenheit; a temperature range of 90 to 110 degrees Fahrenheit; or approximately 100 degrees Fahrenheit.

6. The method of claim 1, wherein exposing the resin particles to the solvent further comprises introducing the resin particles into a first solvent wash using a first solvent having a first purity.

7. The method of claim 6, wherein exposing the resin particles to the solvent further comprises introducing the resin particles into a second solvent wash using a second solvent having a second purity.

8. The method of claim 7, wherein exposing the resin particles to the solvent further comprises introducing the resin particles into a third solvent wash using a third solvent having a third purity.

9. The method of claim 8, wherein the first solvent wash, the second solvent wash, and the third solvent wash are performed in a first vessel, a second vessel, and a third vessel respectively.

10. The method of claim 8, wherein the first solvent wash, the second solvent wash, and the third solvent wash are successively performed in a single vessel respectively.

11. The method of claim 8, wherein the first purity is less than the second purity, which is less than the third purity.

12. The method of claim 1, wherein exposing the resin particles to the solvent further comprises substantially not breaking down the resin particles while removing the contaminants from the resin particles.

13. The method of claim 1, wherein exposing the resin particles to the solvent further consists of solvating one or more of the following types of contaminants from the resin particles: oil; milk, soda; pesticides; detergents; or a combination thereof.

14. The method of claim 1, wherein exposing the resin particles to the solvent further comprising selecting the solvent to have a predetermined specific gravity to facilitate the separation of the resin particles by density.

15. The method of claim 1, wherein exposing the resin particles to the solvent further comprising selecting the solvent to have a predetermined specific gravity, the predetermined specific gravity consisting of one of the following: at least 0.87; between 0.9-1.5 or 0.95-1.25.

16. The method of claim 1, wherein exposing the resin particles to the solvent further comprising exposing the resin particles to an organic solvent.

17. The method of claim 1 wherein the solvent is selected from the group consisting of amyl propionate, butyl butyrate, alkyl lactates, ethyl hexyl acetate, dibasic esters, methyl soyate, ethyl soyate, cyclohexanone, methyl ethyl ketone, dipropylene glycol, dipropylene glycol methyl ether, trichloroethylene, xylene, ethanol, tetrahydrofurluryl, hexane, mineral spirits, monoethanolamine, d-limonene, dimethyl formamide, n-methyl pyrrolodine, propylene carbonate, and combinations thereof, and wherein said alkyl lactate is selected from the group consisting of methyl lactate, ethyl lactate, isopropyl lactate, butyl lactate and combinations thereof.

18. The method of claim 1, wherein exposing the resin particles to the solvent further comprises contacting the resin particles with an alkyl ester solvent having the general formula RCOOR', wherein R and R' are independently selected from C1-C10 alkyl groups and R contains at least one hydroxyl group.

19. The method of claim 1, wherein the resin particles are selected from the group consisting of polypropylene, polyethylene, polyethylene terephthalate, nylon, teflon, polytetrafluoroethylene, polyvinylidene fluoride, and combinations thereof.

20. The method of claim 1, wherein separating the solvent from the resin particles further comprises spinning the resin particles to substantially separate the solvent from the resin particles.

21. The method of claim 20, wherein the spinning of the resin particles removes at least 90% of the solvent by weight from the resin particles.

22. The method of claim 1, further comprising generating a slurry of resin particles, solid waste material and solvent after exposing the resin particles to the solvent.

23. The method of claim 22, further comprising substantially removing the solid waste material from the slurry.

24. The method of claim 1, wherein the exposing the resin particles to the solvent removing agent further comprises exposing the resin particles to a fluid containing carbon dioxide.

25. The method of claim 1, wherein the exposing the resin particles to the solvent removing agent further comprises exposing the resin particles to a fluid containing carbon dioxide to remove the solvent and trace amounts of the contaminants remaining on the resin particles.

26. The method of claim 1, wherein the exposing the resin particles to the solvent removing agent further comprises:

providing the resin particles after separation from the solvent into an extraction vessel; and exposing the resin particles to the solvent removing agent in the extraction vessel.

27. The method of claim 26, wherein the solvent removing agent is a fluid containing carbon dioxide and further comprising introducing the fluid containing the carbon dioxide into the extraction vessel in liquid form.

28. The method of claim 26, wherein the solvent removing agent is a fluid containing carbon dioxide and further comprising introducing the fluid containing the carbon dioxide into the extraction vessel in supercritical form.

29. The method of claim 26, wherein exposing the resin particles to the solvent removing agent in the extraction vessel further comprises:

introducing the solvent removing agent into the extraction vessel at a bottom location of the extraction vessel;

flowing the solvent removing agent upward past the resin particles in the extraction vessel, removing the residual solvent remaining on the resin particles; and removing the solvent removing agent and removed residual solvent from a top location of the extraction vessel.

30. The method of claim 29, wherein the solvent removing agent is a fluid containing carbon dioxide and further comprising maintaining the pressure of the fluid containing the carbon dioxide while flowing in the extraction vessel in a range of approximately 600 to 1000 pounds per square inch.

31. The method of claim 29, wherein the solvent removing agent is a fluid containing carbon dioxide and further comprising maintaining the temperature of the fluid containing the carbon dioxide while flowing in the extraction vessel in a range of approximately 20 to 100 degrees Celsius.

32. The method of claim 26, further comprising
separating the residual solvent from the solvent removing agent after removal from the extraction vessel; and
reusing the solvent removing agent.

33. The method of claim 26, wherein exposing the resin particles to the solvent removing agent in the extraction vessel further comprises agitating the resin particles in the extraction vessel while exposed to the solvent removing agent.

34. The method of claim 26, further comprising exposing the resin particles to the solvent removing agent in the extraction vessel for one of the following periods of time: six minutes or less; ten minutes or less: twelve minutes or less; or fifteen minutes or less.

35. The method of claim 1, further comprising removing bits of label paper from the resin particles after exposing the resin particles to the solvent removing agent.

36. The method of claim 1, wherein receiving the resin further comprises receiving the resin compacted in bale form and removing any wires used to hold the bale together.

37. The method of claim 1, further comprising separating the received resin by introducing the received resin into a trommel, the trommel separating individual pieces of the received resin from one another.

38. The method of claim 1, further comprising sorting the received resin by color.

39. The method of claim 38, wherein sorting the resin by color further comprises separating clear resin from colored resin.

40. The method of claim 38, wherein sorting the received resin further comprises sorting the resin using an optical scanner.

41. The method of claim 1, wherein grinding the resin into particles further comprises grinding the resin received in the form of containers and bottles into particles.

42. The method of claim 1, further comprising sorting the resin particles by type, the types consisting of one or more of the following: HDPE, PET, PVC, mixed plastic, vinyl chloride, polyethylene.

43. The method of claim 42, wherein sorting the resin particles by type further comprises sorting the resin particles using an optical sorter.

44. The method of claim 1, wherein the receiving the resin further comprises receiving the resin in the form of resin bottles and containers.

45. The method of claim 1, further comprises pelletizing the resin particles after exposing the resin particles to the solvent.

46. The method of claim 41, wherein the particles are flakes.

47. The method of claim 46, wherein the flaxes are approximately ⅜ inch flakes.

* * * * *